United States Patent [19]
Yoshikawa

[11] Patent Number: 5,861,733
[45] Date of Patent: Jan. 19, 1999

[54] BATTERY CHARGER

[75] Inventor: Shozo Yoshikawa, Tokyo, Japan

[73] Assignee: Kyocera Corporation, Kyoto, Japan

[21] Appl. No.: 950,509

[22] Filed: Sep. 12, 1997

Related U.S. Application Data

[63] Continuation of Ser. No. 586,978, Jan. 16, 1996, abandoned.

[30] Foreign Application Priority Data

Jan. 19, 1995 [JP] Japan ................................ 7-024620

[51] Int. Cl.$^6$ ...................................................... H02J 7/04
[52] U.S. Cl. .......................................... 320/143; 320/114
[58] Field of Search ................................... 320/143, 140, 320/162, 163, 164

[56] References Cited

U.S. PATENT DOCUMENTS

| | | | |
|---|---|---|---|
| 5,182,510 | 1/1993 | Nakamura | 322/21 |
| 5,237,259 | 8/1993 | Sanpei | 320/39 X |
| 5,408,170 | 4/1995 | Umetsu et al. | 320/39 |
| 5,541,490 | 7/1996 | Sengupta et al. | 320/14 |
| 5,557,192 | 9/1996 | Tamai | 320/30 |

FOREIGN PATENT DOCUMENTS

| | | |
|---|---|---|
| 4027146 | 3/1992 | Germany . |
| 588569 | 3/1994 | Germany . |
| 4431620 | 3/1995 | Germany . |
| 1077433 | 3/1989 | Japan . |

Primary Examiner—Peter S. Wong
Assistant Examiner—K. Shin
Attorney, Agent, or Firm—Loeb & Loeb LLP

[57] ABSTRACT

In a battery charger in which an output voltage and an output current from the battery charger are compared with a reference voltage, respectively, and an error voltage is fed back, so that, in an initial charging period, constant-current charging is performed and, after a battery voltage reaches a constant value, constant-voltage charging is performed, an adder 11 for adding a voltage Vg which is proportional to a charging current of a battery 9, to the reference voltage Vr which is to be compared with the output voltage of the battery charger 20 is disposed, and the output voltage V of the battery charger 20 is controlled while feeding back an error voltage obtained as a result of a comparison of the added value output from the adder 11 with the output voltage V of the battery charger 20.

4 Claims, 6 Drawing Sheets

BATTERY CHARGER

This is a continuation of application Ser. No. 08/586,978 filed on Jan. 16, 1996, now abandoned.

BACKGROUND OF THE INVENTION

The invention relates to a charging circuit for a battery such as a lithium ion battery, and particularly to a battery charger in which the constant-current charging region can be prolonged so that the total charging period is shortened.

FIG. 3 is a diagram showing an example of the configuration of a conventional battery charger. Referring to FIG. 3, a prior art battery charger 120 comprises: a control unit 101 which controls a voltage and a current; a voltage detecting unit 102 which compares an output voltage obtained as a result of the voltage division of resistors 105 and 106 with a reference voltage Vr and outputs a control signal; a current detecting unit 103 which detects an output current from a shunt resistor 104 and outputs a control signal; an output switch 107 which turns on or off the output current; and charging terminals 108 to which a battery 109 is to be connected. A charging current is supplied to the battery 109 via the charging terminals 108.

FIG. 4 is a graph showing charging characteristics of a charging circuit of the prior art battery charger. When the battery 109 is connected to the charging terminals 108 and the output switch 107 is turned on, charging is started. In the initial charging period, the control unit 101 controls the charging current Ic' so as to be suppressed to a constant value, in accordance with the feedback of the output signal of the current detecting unit 103. During this period, the charging voltage Vb' of the battery 109 rises from a start voltage Vs as shown in the figure (constant-current charging region). After the charging voltage Vb' reaches (preset voltage $V_0$—dropped voltage V') (a voltage equal to a voltage drop caused by the resistances of the output switch 107, the charging terminals 108, the wiring, etc.), the control unit 101 controls the output voltage so as to be constant, in accordance with the feedback of the output signal of the voltage detecting unit 102. Accordingly, the charging current Ic' attenuates as time elapses, and the charging voltage Vb' becomes closer to the preset value $V_0$ of the constant voltage (constant-voltage charging region). When the control unit 101 detects a current $I_0$ at a full charge time $t_2$, the control unit 101 judges that charging is completed, and turns off the output switch 107 so as to terminate charging.

However, charging performed by the conventional charging circuit has the following problems. In a latter half of the charging period, charging is performed at the constant voltage and hence the charging current gradually attenuates. As a result, the charge completing time period $t_2$ required for attaining the fullcharge of the battery 109 is prolonged. This is inconvenient, and the operation efficiency is degraded. The charge capacity of the battery 109 is represented by (charging current×charging time period). As the constant-current charging region in which the maximum charging current is caused to flow is extended, the charge completing time period $t_2$ is shortened. In the latter half of the charging period, however, charging is performed at the constant voltage $V_0$ so that the charging voltage Vb' does not exceed the preset voltage. As a result, the charge completing time period $t_2$ is prolonged.

There is another method in which charging is performed by using a pulse voltage, in order to shorten the charge completing time period $t_2$. However, this method has a problem in that the open-circuit voltage (OCV) of the battery 109 temporarily exceeds the preset voltage so that the lifetime of the battery 109 is shortened.

SUMMARY OF THE INVENTION

The invention has been conducted to overcome the above-mentioned problems. It is an object of the invention to provide a battery charger in which the charge completing time period is shortened by prolonging a period for performing constant-current charging, thereby solving the above-mentioned problems.

In order to solve the above-mentioned problems, according to the invention, in a battery charger in which an output voltage and an output current from the battery charger are compared with a reference voltage, respectively, an error voltage is fed back, and, in an initial charging period, constant-current charging is performed and, after a battery voltage reaches a constant value, constant-voltage charging is performed, adding means for adding a voltage which is proportional to a charging current of a battery, to the reference voltage which is to be compared with the output voltage of the battery charger is disposed, and the output voltage of the battery charger is controlled while feeding back an error voltage obtained as a result of a comparison of the added value output from the adding means with the output voltage of the battery charger.

In the invention having the above-described configuration, a voltage which is proportional to a charging current of the battery is added to the conventional reference voltage. Accordingly, the output voltage of the battery charger in the constant-current charging region rises to a level higher than that in the conventional battery charger so that the time period of the constant-current charging region can be prolonged. Thus, charging proceeds rapidly.

In the constant-voltage charging region, the charging current attenuates. Consequently, the aforementioned added value gradually becomes closer to the reference voltage, and the output voltage of the battery charger is converged on the preset voltage of the reference voltage. If the value of the resistor producing the voltage which is proportional to the charging current is appropriately selected, therefore, the open-circuit voltage (OCV) of the battery does not eventually exceed the preset voltage. Thus, an overcharge can be prevented from occurring so that the lifetime will not be shortened. In the constant-current charging region, since the charging proceeds rapidly, the total charging time period can be greatly shortened.

DETAILED DESCRIPTION OF PREFERRED EMBODIMENTS

Figure 1:
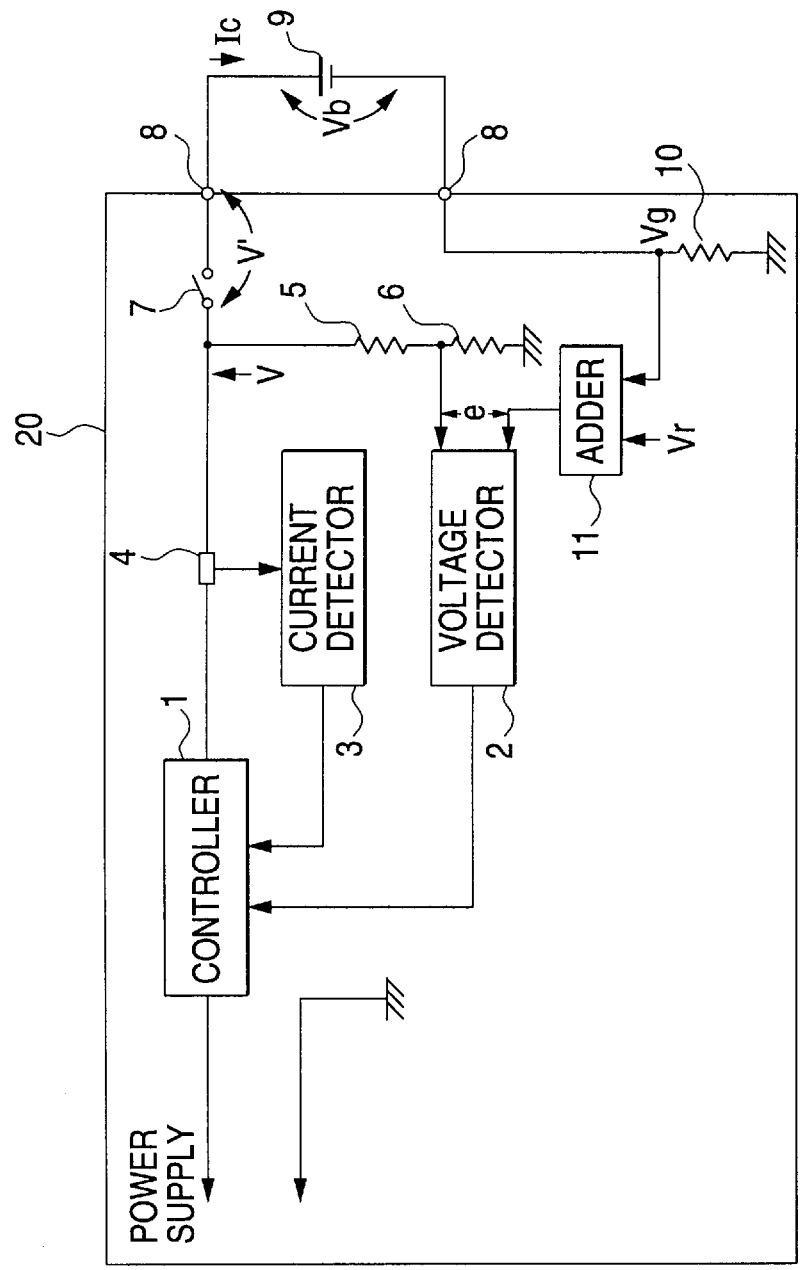
FIG. 1 is a diagram showing an example of the configuration of a charging circuit of the battery charger of the invention.

Hereinafter, an embodiment of the invention will be described in detail with reference to the drawings. FIG. 1 is a diagram showing an example of the configuration of the battery charger 20 of the invention. As shown in the figure, the battery charger 20 of the invention is the same as the conventional battery charger in that the battery charger 20 of the invention comprises: the control unit 1 which controls a voltage and a current; the voltage detecting unit 2 which compares an output voltage obtained as a result of the voltage division of the resistors 5 and 6 with the reference voltage Vr and outputs a control signal; the current detecting unit 3 which detects an output current from the shunt resistor 4 and outputs a control signal; the output switch 7 which turns on or off the output current; and the charging terminals 8 to which the battery 9 is to be connected.

The charging circuit of the battery charger 20 of the invention is characterized in that the voltage Vg which is proportional to the charging current Ic of the battery 9 is produced by a resistor 10, an adder 11 which adds the voltage Vg to the reference voltage Vr is disposed, and the voltage control is performed while comparing the added value (=Vr+Vg) with the output voltage V.

Figure 2:
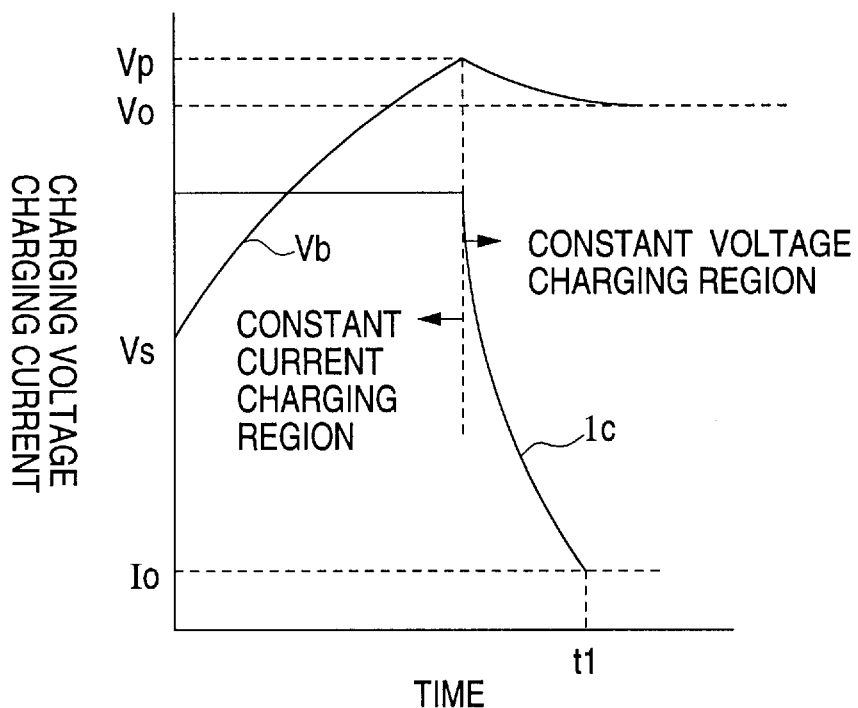
FIG. 2 is a graph showing charging characteristics of the battery charger of the invention.
Figure 3:
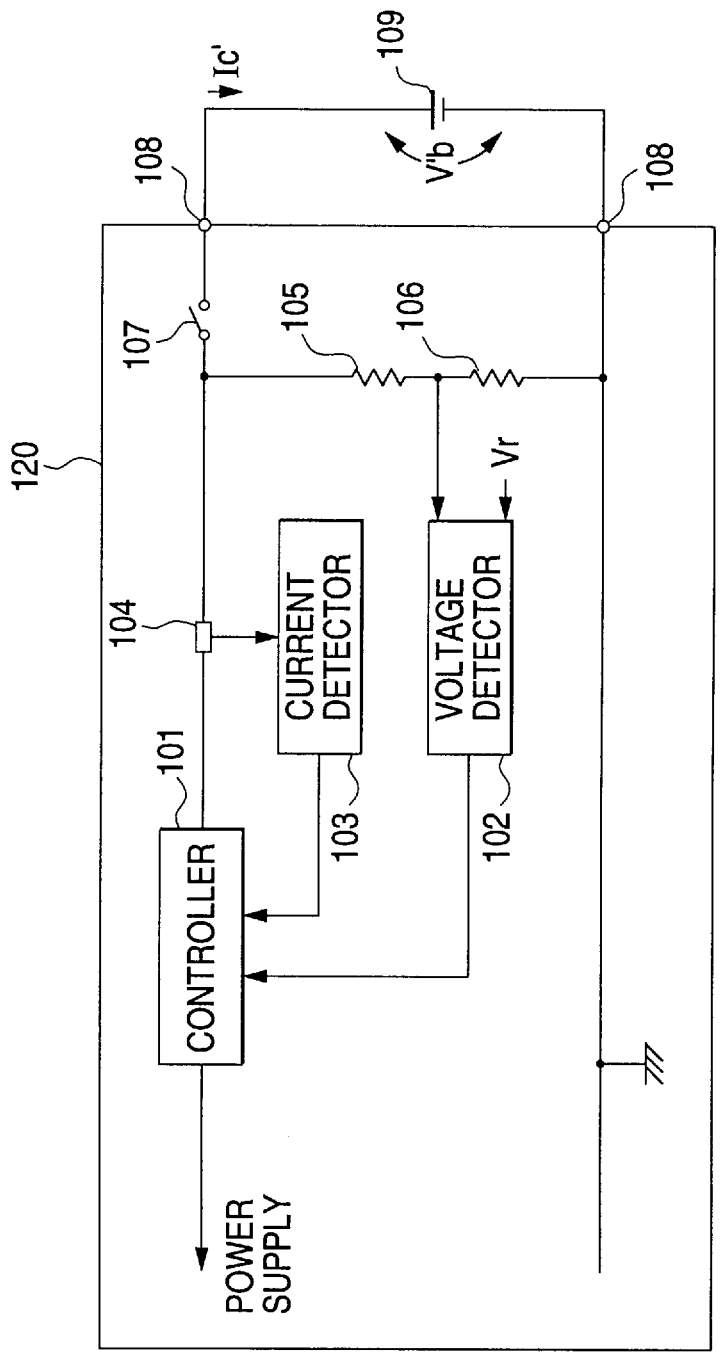
FIG. 3 is a diagram showing an example of the configuration of a charging circuit of a prior art battery charger.
Figure 4:
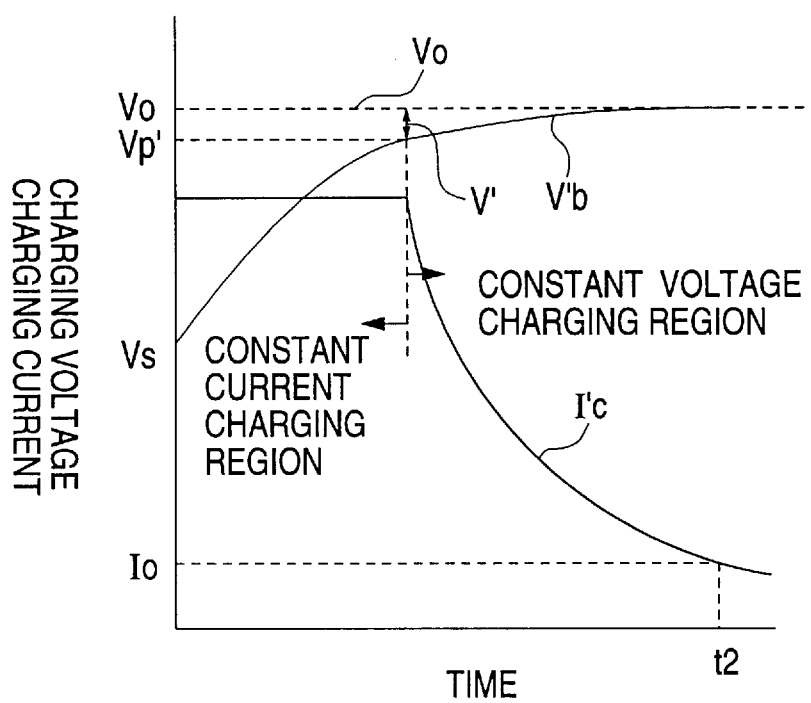
FIG. 4 is a graph showing charging characteristics of the prior art battery charger.

FIG. 2 is a graph showing charging characteristics of the charging circuit of the battery charger of the invention. When the battery 9 is connected to the charging terminals 8 and the output switch 7 is turned on, charging is started. In the initial charging period, the control unit 1 controls the charging current Ic so as to be suppressed to a constant value, in accordance with the feedback of the output signal of the current detecting unit 3. During this period, the charging voltage Vb of the battery 9 rises from a start voltage Vs as shown in the figure.

Hereinafter, the change of the charging voltage Vb will be described. The output voltage V is expressed by the following expression:

$$V = Vb + Vg + V' \quad (1)$$

where
V: output voltage,
Vb: battery voltage,
Vg: voltage proportional to the charging current, and
V': amount of voltage drop.

In the constant-voltage charging region, the control unit 1 performs the feedback control so that the input voltage (error voltage e) of the voltage detecting unit 2 becomes zero. If the output voltage V is expressed by using the reference voltage Vr, the resistance R1 of the resistor 5, and the resistance R2 of the resistor 6, the output voltage V is expressed as follows:

$$\begin{aligned} V &= (Vr - Vg)(1 + R1/R2) \quad (2)\\ &= Vr(1 + R1/R2) + Vg + Vg \cdot R1/R2 \\ &= V_0 + Vg + Vg \cdot R1/R2 \end{aligned}$$

where $V_0$ denotes the output voltage when the charging current is 0.

The following expression is obtained from Expressions (1) and (2):

$$Vb = V_0 + Vg \cdot R1/R2 - V' \quad (3)$$

That is, if the value of the resistor 10 is appropriately selected (if the value of Vg is appropriately selected), in the constant-current charging region of the charging current Ic, the charging voltage Vb exceeds the preset voltage $V_0$, and then reaches Vp. In the constant-voltage charging region, the charging current Ic decreases so that the charging voltage Vb decreases in accordance with Expression (3). The charging voltage is shown by a curve indicated by Vb in FIG. 2.

Figure 5:
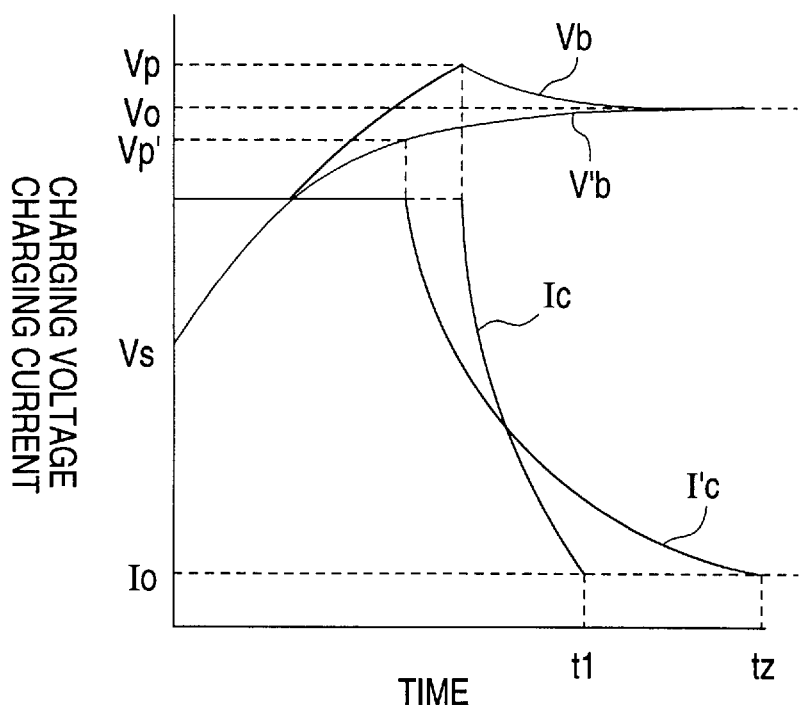
FIG. 5 is a graph showing charging characteristics of the battery charger of the invention and those of the prior art battery charger.

FIG. 5 is a graph showing charging characteristics of the battery charger of the invention and those of the prior art battery charger. In the figure, Vb and Ic denote the charging voltage and the charging current in the battery charger of the invention, respectively, and Vb' and Ic' denote the charging voltage and the charging current in the conventional battery charger, respectively.

As seen from FIG. 5, according to the charging characteristics of the battery charger of the invention, the charging voltage Vb exceeds the preset voltage $V_0$, and is eventually converged on the preset voltage $V_0$ from larger values. If the value of the resistor 10 which produces the voltage Vg proportional to the charging current is appropriately selected, therefore, the open-circuit voltage (OCV) of the battery does not exceed the preset voltage. Thus, no overcharge occurs, and the lifetime will not be shortened. The period of charging in the constant-current charging region is prolonged, and charging proceeds rapidly. Thus, the constant-voltage charging region is shortened, and the charge completing time period is greatly shortened from $t_2$ to $t_1$.

Figure 6:
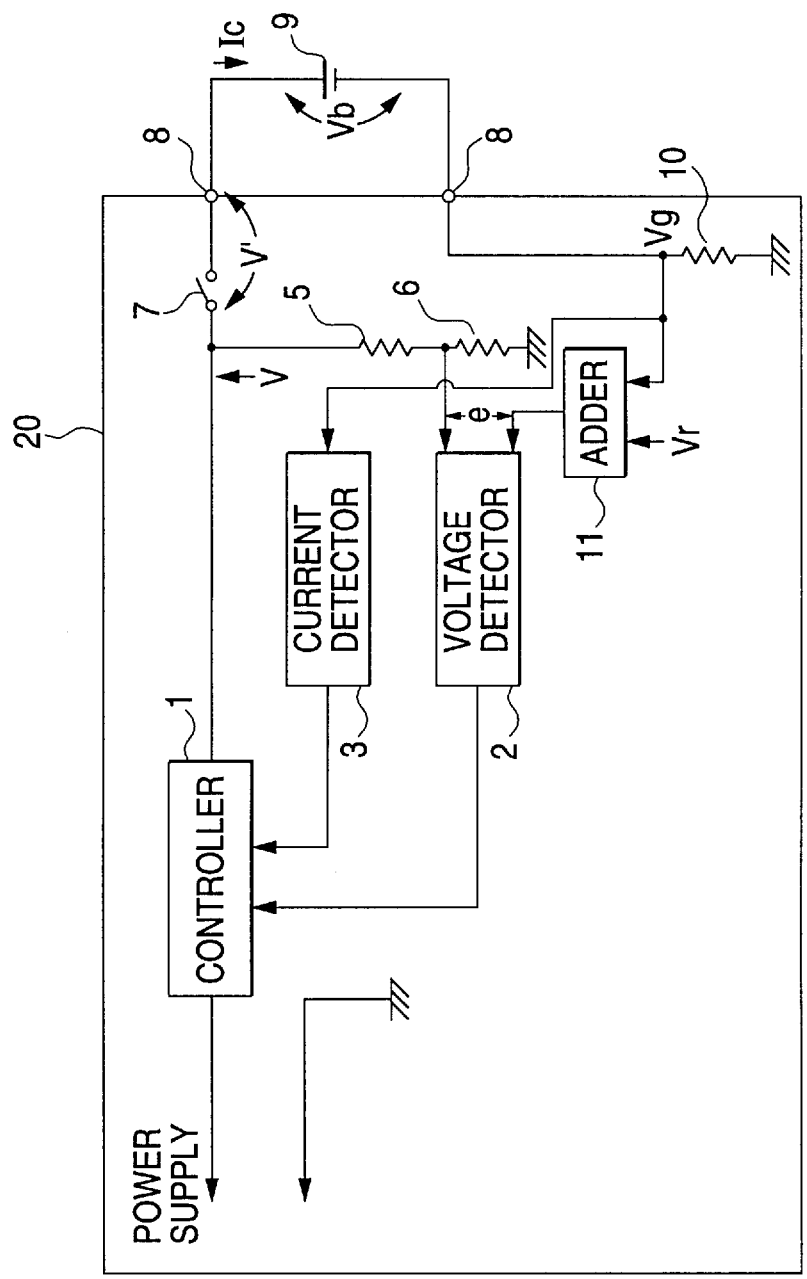
FIG. 6 is a diagram showing another example of the configuration of the battery charger of the invention.

FIG. 6 shows an example in which the configuration of FIG. 1 is simplified. In this example, the shunt resistor 4 used in the example of FIG. 1 is omitted. Instead of the shunt resistor 4, the resistor 10 which produces the voltage Vg is utilized so that the output current is introduced from the resistor 10 to the current detecting unit 3, whereby the number of components is reduced.

As described above in detail, according to the invention, the following excellent effects can be attained.

A voltage which is proportional to a charging current of a battery is added to a conventional reference voltage, so that the output voltage of the battery charger in the constant-current charging region rises to a level higher than that in a conventional battery charger. Accordingly, the time period of the constant-current charging region can be prolonged so that charging proceeds rapidly. In the constant-voltage charging region, the charging current attenuates so that the comparison signal gradually becomes equal to the reference voltage, and the output voltage of the battery charger is then converged on the preset voltage of the reference voltage. If the value of the resistor which produces the voltage Vg proportional to the charging current is appropriately selected, therefore, the open-circuit voltage (OCV) of the battery will not exceed the preset voltage. Thus, no overcharge occurs, and the lifetime will not be shortened. In addition, since the charging proceeds rapidly in the constant-current charging region, the charge completing time can be greatly shortened.

If a transistor switch or the like is used as an output switch, a large loss is produced and the charging time period is greatly prolonged. For these reasons, a relay (or a switch) is used in the prior art. In the invention, the charging voltage can be desirably set, so that it is easy to compensate for the loss even when a transistor switch or the like is used.

What is claimed is:

1. A battery charger, comprising:
    addition means for adding a reference voltage and a voltage that is proportional to a battery charging current and for generating a sum voltage,
    a voltage detector for comparing the sum voltage and a battery charging voltage and for generating a first control signal in response to the comparison of the sum voltage and the battery charging voltage,
    a current detector for detecting a battery charging current and for generating a second control signal in response to the detected battery charging current, and a controller for controlling the battery charging voltage and the battery charging current in response to the first control signal and the second control signal, wherein the addition means comprises a resistor into which the battery charging current flows and an adder for adding a voltage generated across the resistor with the reference voltage, and wherein the voltage generated across the resistor is applied to the current detector.

2. The battery charger of claim 1, wherein the voltage detector comprises a voltage divider for dividing the battery charging voltage.

3. The battery charger of claim 1, wherein the current resistor acts as the current sensing resistor for the current detector.

4. A battery charger for supplying a charging current (Ic) to a battery (9), comprising:

first and second battery charging terminals (8) between which the battery is connected during charging, addition means including a resistor (10) connected in series to the battery between the second terminal and ground for conducting only the charging current (Ic) so that a voltage (Vg) proportional to the charging current (Ic) is generated across the resistor (10) during charging, and an adder (11) for adding a reference voltage (Vr) and the voltage that is proportional to the charging current and for generating a sum voltage, voltage detection means (2) including a voltage divider (5, 6) connected between the first battery charging terminal (8) and a ground, and a voltage detector (2) for comparing the sum voltage with a voltage representing an output voltage (V) of the battery charger (20), which is output from the voltage divider (5, 6) and for generating a first control signal in response to the comparison of the sum voltage with the voltage representing the output voltage, a current detector (3) for detecting a power supplying current and for generating a second control signal in response to the detected power supplying current, and a controller (1) for controlling the output voltage (v) and the battery charging current in response to the first control signal and the second control signal.

* * * * *